United States Patent Office 3,475,180
Patented Oct. 28, 1969

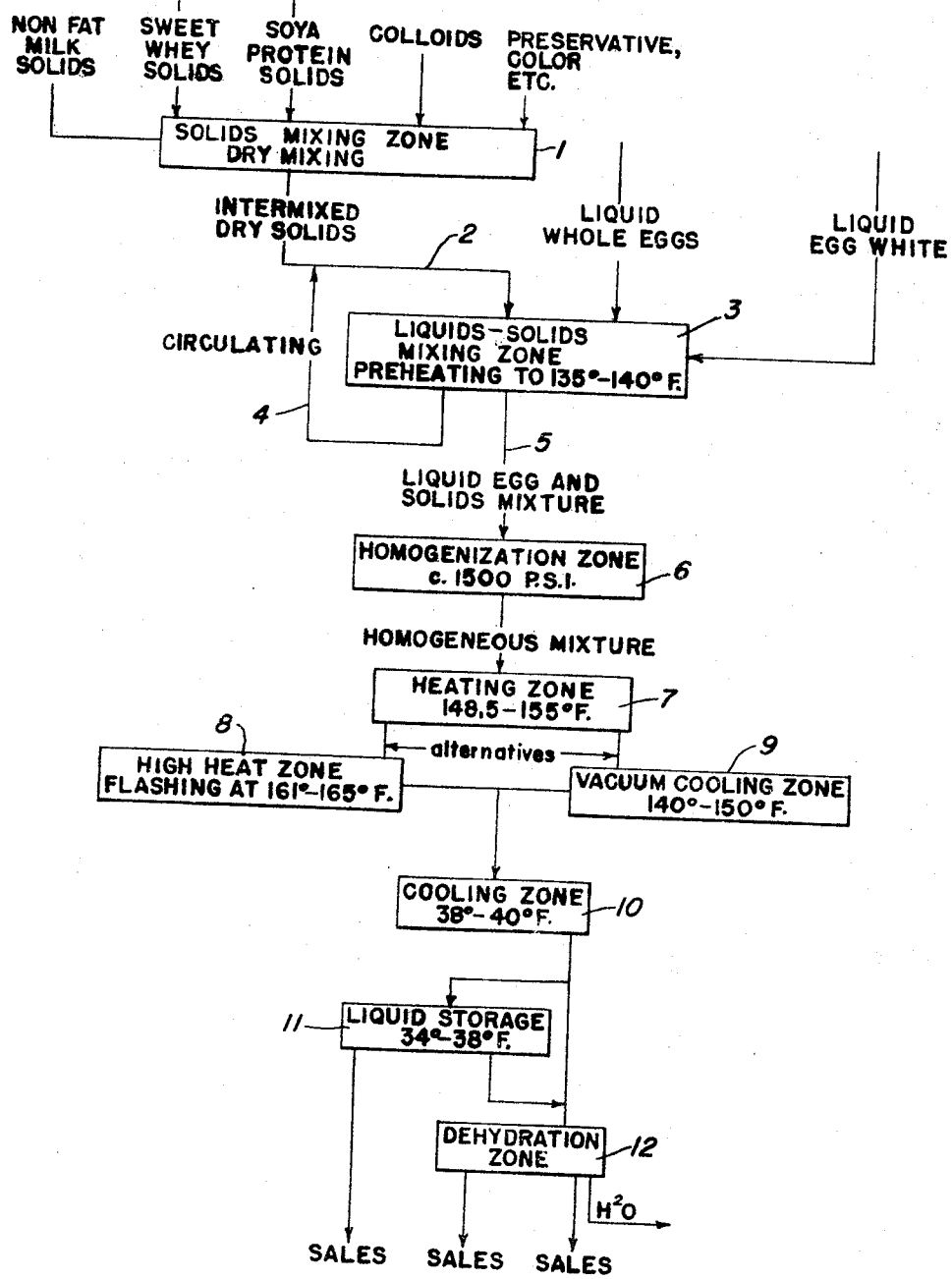

3,475,180
LOW-CALORIE EGG PRODUCT
Robert Eynon Jones, Oakland, Calif., assignor to Tillie Lewis Foods, Inc., Stockton, Calif., a corporation of Delaware
Filed Aug. 24, 1967, Ser. No. 663,007
Int. Cl. A23j 1/08
U.S. Cl. 99—113                                        21 Claims

ABSTRACT OF THE DISCLOSURE

This low-calorie egg product, when re-constituted, resembles whole fresh egg in taste and nutritional value and contains, by weight, approximately:
  150 parts of liquid egg white,
  30 to 100 parts of liquid whole egg,
  8 to 16 parts of solids chosen from the group consisting of non-fat milk solids, sweet whey solids, and a mixture of the non-fat milk and sweet whey solids with each other,
  ½ part to 4 parts of isolated vegetable protein solids,
  0.1 to 2 parts of hydrophilic thixotropic material chosen from the group consisting of sodium carboxymethylcellulose, pregelled starch, methyl cellulose, guar gum, gum arabic, gum tragacanth, agar-agar, carrageen, and aliginic acid and salts thereof,
intimately mixed and adjusted to a pH of at least 9.

The product is pasteurized, after mixing the parts together, to 100% Salmonella negative. It may then be dehydrated to a powder, which is capable of exhibiting the functional foaming and stiffness of whole fresh egg when mixed with up to five parts of water to each part of the powder.

---

This invention relates to egg food products and to processes for preparing the same. More particularly, it relates to a low-calorie, high-protein dried egg product having a reduced fat content. Still more particularly, it pertains to such dried egg product containing dried milk and other substitute proteins.

Eggs are well recognized as a choice natural food and are utilized in a number of food products, both as constituents of baked foods such as cakes and the like, and as the primary component of egg dishes such as omelets and scrambled eggs.

Since fresh whole eggs contain approximately 75% water, the egg industry has resorted to dehydration to reduce shipping costs and to lengthen storage life.

For many years, the egg industry has devoted much effort to produce dried egg products which could be reconstituted with water for use in cooked egg dishes such as scrambled eggs, omelets and the like. In most cases, however, the reconstituted dried eggs have performed poorly in cooking and have lacked pleasing appearance and satisfactory taste. As a result, the industry has chiefly limited its efforts to the production of dried egg products designed for use as ingredients in baked goods, such as cakes and the like.

However, the concentrated egg product of this invention is superior to frozen whole eggs in the areas of efficiency, economy and sanitation. The product is immediately available to use without thawing, permits a faster mixing time, and is easier to handle and to store. It involves no scraping of material from cans, a practice which consumes time and labor and is a source of possible contamination. It eliminates refreezing of thawed eggs left over after a day's run, which is costly and also exposes the product to possible contamination.

Recently, considerable emphasis has been placed upon low-calorie and low-fat diets. Since essentially all the fat, and a large proportion of the calorific content, of whole eggs is contributed by the egg yolk, restricted use of eggs yolks is indicated for those persons adopting low-calorie and/or low-fat diets. When attempts were made to produce palatable products using egg whites alone, the results have been notably unsatisfactory. In contrast, the product of this invention is tasty and has a protein composition that is probably nutritionally superior to fresh eggs.

Among the main problems in manufacturing dried-egg products is the proper application of both the dehydrating and pasteurization steps. It is essential for the product to be completely Salmonella negative. Both pasteurization and dehydration call for application of heat, which must be adequate for the purpose but must not be intense enough to produce coagulation or cooking of the egg albumen.

Salmonella, a type of bacteria, is the nation's foremost cause of food poisoning, affecting an estimated two million persons a year, and is occasionally fatal. The infection has been traced principally to poultry and livestock and has brought expensive damage suits on food processors, impelling major producers to recall millions of dollars worth of dry milk, drugs, candy, dessert mixes and other dairy-related products from the market. With the new product of this invention, manufacturers are able to put a 100-percent Salmonella-free equivalent of whole eggs into cake and food mixes, custards, and salad dressings.

Total elimination of Salmonella contamination is achieved essentially by treating eggs at ultra-high pasteurization temperatures, and an important feature of this invention is that this is done without the loss of functional properties, which has normally occurred in other egg products when pasteurized above the level required by the U.S. Department of Agriculture.

The pasteurization of eggs and egg products has long been a controversial subject, because early attempts at pasteurization resulted in a loss in the functionability of the egg, having a deleterious effect on its foaming and emulsification properties. Based on these observations, the pasteurization of egg and egg products was permitted to be defined at not less than 140° F. for 3½ minutes and not more than 4 minutes. This is not true pasteurization, giving only a 97.5% kill. Spray-drying failed to reduce the bacteriological problems after pasteurization, for although the spraying of the atomized liquid egg into a temperature of approximately 385° F. might seem likely to reduce the bacteria count, it does not, because of the cooling effect of the evaporation and the removal of the moisture burden.

I have found that pasteurization of liquid egg material can be effected bacteriologically only by subjecting the liquid egg to a pasteurization temperature of not less than 148° F. and for not less than 2½ minutes at that temperature. The problem has been that albumen (liquid egg whites) coagulates completely at 133° F. and that liquid whole egg and yolk demonstrate a marked loss of functionability, when exposed to pasteurizing temperatures at even 140° to 145° F. for any length of time. Clearly, the problem is how to protect the coagulable proteins, and the present invention does this by means of additives which enable exposure to adequate pasteurization temperature and time without the loss of the vital functional properties.

The unique new egg product of this invention is a substitute for whole egg, retaining the functional and nutritional properties of whole eggs, except for the fat content, which may be predetermined and controlled at a desired level. This new product is more economical and easier to use than conventional egg products, since it is reliquefied in a ratio of four to five (preferably five)

pounds of water to one pound of product, compared to a prior-art three-to-one ratio for dried egg material. To gain a reliquefying ratio superior to that of dried whole egg, with an actual lowered solid content is a radical departure from the conventional. Moreover, the ingredients as selected and offered are so employed as to establish a pH outside the range of 4 to 9 which is necessary for survival of bacteria; the pH of this new product is 9 or higher, but the added ingredients mask what would otherwise be noticed in taste.

Tests made for the convenience food market showed that adding the egg product of this invention to present cake mixes produced cakes of superior volume and texture. Thus, the invention enables cake mix makers to offer homemakers convenience items that are lower in calories and require only the addition of water.

It is an object of this invention to provide a new and improved dried product particularly adapted for reconstituting with water for use in the preparation of egg dishes. An important feature of the invention is that when reconstituted it can give the physical qualities imparted by eggs even when considerably greater quantities of water are used. It is reliquefied at a ratio of four or five pounds of water to one pound of the product instead of the conventional three-to-one ratio; yet produces cakes of superior volume and texture.

A further object is to provide a new and improved method for preparing a dried egg product which is particularly adapted for reconstitution with water or non-fat milk to supplant fresh eggs in the preparation of foods.

A still further object is to provide for the production of a new concentrated egg product low in calories and cholesterol, high in protein and 100% Salmonella negative, which retains the functional and nutritional properties of whole eggs, except for fat and cholesterol, which may be predetermined and controlled at a desired level.

A still further object is to provide conditions and means for dehydrating and pasteurizing such an egg product and rendering it completely Salmonella negative without impairing its functional properties.

Other objects will be apparent from the following description.

Briefly, the invention involves removing a specific amount of the yolks from a desired quantity of liquid whole eggs, replacing the protein content of the withdrawn yolks by adding milk and soya proteins, and supplementing functional performance by adding carboxymethylcellulose, then pasteurizing, homogenizing and spray-drying the resulting mixture. The invention also includes, in preferred forms, the incorporation of emulsifiers, preservatives, and color at specified points of the processing.

Rather than remove part of the yolks from a batch of whole eggs, in practice I find it more desirable to blend liquid whole eggs with liquid egg white (i.e., eggs from which all the yolks have been removed), thereby obtaining a mixture equivalent to liquid whole eggs from which part of the yolks have been removed. To this end I may, for example, blend three parts by weight of liquid egg white with one part of liquid whole egg to obtain four parts of a mix that is equivalent to that obtained by removing about two parts by weight of yolk from six parts of liquid whole egg. Since whole fresh eggs are composed of about 60% white and 40% yolk, the foregoing would be equivalent to removing about ⅚ of the yolks from a batch of liquid whole eggs.

The use of only a small amount of the yolks present in whole egg is an important feature of my invention. The elimination of most of the yolk is necessary to reduce the fat, the cholesterol, and caloric content of the product. When more fat and cholesterol are desired, more yolk (whole egg) is used. Thus, the fat and cholesterol level can be controlled.

On the other hand, the small amount of yolk used is required to maintain real egg flavor and thereby provide a fully satisfactory product. The amount of egg yolk used in accordance with the invention may vary between about one-fifth to one-half of that present in liquid whole egg.

To replace the value of the protein content (16%) of the yolk removed, or omitted from, the whole eggs in accordance with the invention, I prefer to add a mixture of dry non-fat milk solids, dry sweet whey, and isolated soya protein. Thus, when two parts egg yolk are removed from six parts of liquid whole egg to obtain four parts of a preferred liquid mix as described above, the protein content may be reduced from about 13% protein in the whole egg to about 11% in the mixture. Then by adding about 5 parts by weight of non-fat dried milk solids (36% protein), about 7 parts by weight of sweet whey (13% protein) and about one part of isolated soya protein (75% protein) to 200 parts of the liquid egg white— whole egg mixture, the protein content of the resulting composite will be restored to about 13%.

My new egg product contains by weight, approximately:
  150 parts of liquid egg white,
  30 to 100 parts of liquid whole egg,
  8 to 16 parts of solids chosen from the group consisting of non-fat milk solids, sweet whey solids, and a mixture of the non-fat milk and sweet whey solids with each other,
  ½ parts to 4 parts of isolated vegetable protein solids,
  0.1 to 2 parts of hydrophilic thixotropic material chosen from the group consisting of sodium carboxymethylcellulose, pregelled starch, methyl cellulose, guar gum, gum arabic, gum tragacanth, agar-agar, carrogeen, and alginic acid and salts thereof,
Intimately mixed and adjusted to a pH of at least 9.

This product is pasteurized, after mixing the parts together, to 100% Salmonella negative, and preferably it is thereafter dehydrated to a powder. The protein solids may contain between 0.1 and 15 parts of soya lecithin, and the 8 to 16 parts may be equal portions of non-fat milk solids and sweet whey solids. Also, the product is homogenized, preferably before pasteurization.

Non-fat milk solids are an excellent source of protein for replacing the protein lost in the reduction of the yolk content. This protein is not coagulable at the temperatures used in this processing technique and has fair solubility. The protein content of the non-fat milk is typically about 35.9%, the fat content about .8%, and the carbohydrate content about 52.3%. The carbohydrate is in reality milk, sugar or lactose, which remains fluid in water at temperatures far in excess of what is demanded for egg pasteurization. The use of too much non-fat milk tends to impart an unnatural sweet characteristic to the product. Liquid non-fat milk or condensed or evaporated non-fat milk may be used by employing the solids value of each and arriving at the desired amount. The use of liquid non-fat milk, regardless of the solids content, does increase the moisture burden in the drying operation, but this is usually unimportant.

Sweet whey comprises the non-coagulable solids of milk, having a protein value of 12.9%, fat of 1.1%, and a carbohydrate or lactose content of 73.5%. Sweet whey is used in preference to high acid whey, because sweet whey does not cause a lowering of the pH in the final product that would otherwise effect the blandness associated with fresh whole egg. Since sweet whey is non-coagulable with excellent solubility, it helps to retain stability of the product during pasteurization, acting as a kind of temperature buffer. Too little sweet whey reduces the ability of the other proteins in the liquid egg to withstand exposure to the employed pasteurization temperature. Too much of it may make the taste too sweet. The sweet whey may be used dry or in liquid form, as may the milk solids noted above.

The egg product of this invention, when reconstituted with water preferably has a total solids content of 21.5% in comparison to a 25.5% solids content of whole egg. The sweet whey content may be increased in this product to gain a 25.5% solids content, without affecting palatibility. Beyond this point it would not be duplicating whole egg as to sugar content. The additional solids may be divided between the non-fat milk solids and the sweet whey solids. The additional solids would increase the dryer yield and lower the cost of dryer operation materially. The two milk by-products may supplement each other for some uses, such as baking, where the taste in relation to that of fresh egg is not too critical and may be masked. In fact, the dry sweet whey content could be increased to replace all the dry non-fat milk content (or vice versa) without any palatability problems occurring in an association with fresh whole egg.

Isolated soya protein is another source of protein, one of exceptionally high protein value. The protein content is 74.9%, fat is .1%, and carbohydrate is 15.1%. The solubility is good and it is non-coagulable when in solution at temperatures far in excess of the pasteurization temperature necessary in this application. There are many soya proteins, such as defatted soya protein, modified soya protein, and isolated soya protein as well as enzyme modified soya protein, and lecithinated soya protein, and other equivalent vegetable proteins may be used. When using soya lecithin, it can be used in a wide range of weights. The principal uses of soya protein in this invention are to furnish protein lost in the reduction of the actual yolk content of whole egg and to act as a binder, as does the protein in whole egg. The incorporation of more soya protein than recommended herein presents flavor and odor problems, a slightly foreign taste as well as mealiness, and a pronounced toughness in a scrambled egg.

To improve the consistency of my product, particularly when reconstituted with water, I employ a small amount of a thixotropic, hydrophilic colloid, such as carboxymethylcellulose, preferably sodium carboxymethylcellulose, such as about 0.05% to 1% of the liquid mixture or about 0.2% to 4% of the finished dry product.

While other thickeners have been employed by the art in preparation of egg products, as far as I know carboxymethylcellulose has not been used in egg products, probably because of the difficulty heretofore of incorporating it into the egg product. When used in conjunction with the non-fat milk solids, sweet whey, and soya protein, the incorporation difficulty disappears, and this is an important feature of the invention.

A variety of gums or colloidal agents may be used in place of carboxymethylcellulose, such as starches, both pregelled and modified, as well as the guar gums having 5 to 8 times the thickening properties of the starch products. Experiments have been conducted with virtually all the gums available for use in food. Chemically, the gums consist largely of carbohydrates and are hydrophilic colloids. Examples are gum arabic, gum tragacanth and agar-agar. Laboratory trials were also made with algin and its derivatives (alginic acid and its salts such as sodium alginate and calcium alginate) as to their hydrophilic and colloid properties as well as comparative studies with carrageen, a gelatinous extract of seaweed, a complex carbohydrate well known as an emulsifier and stabilizer. Further studies were conducted with methylcellulose and sodium carboxymethylcellulose. These studies demonstrated the superior colloidal properties of the sodium carboxymethylcellulose to the water-soluble starches or carbohydrates, gelatins, gums and other thixotropic hydrophilic colloids in thickening and stabilizing the egg solutions, in dispersion and suspension ability. The thixotropic properties of sodium carboxymethylcellulose are noticeable in the reliquefied egg product as well as in bake test results. Most of the mentioned ingredients may be used in its place, but not with the same outstanding results. The level used in the examples is approximate. More could be used, or the level could be reduced to about 2% of the preferred content, but this makes a product that would ordinarily be too thin.

In estimating the tolerance of the additives as used in fortifying the liquid egg with the exception of the sodium carboxymethylcellulose, it is well to consider that the product of this invention is derived from a liquid with a 21.5% solids content. Since 25.5% solids is the accepted standard for liquid whole egg, this offers a 4% solids value that may be incorporated into the liquid egg by increasing the milk, sweet whey or soya protein.

A suitable grade of sodium carboxymethylcellulose is that designated by the trade as "7LP" which has a relatively low viscosity readily adapted to the processing steps hereof. The low-viscosity sodium carboxymethylcellulose is preferred over the grades creating a higher viscosity, as the flow through the processing system is more fluid. It has not only exceptional emulsification and colloidal properties but also a desirable protecting action by coating the coagulable proteins. I have found that 1 gram of sodium carboxymethylcellulose is the equal of $7/10$ gram of dried whole egg in creating a suspension in reliquefying the dried egg product. It acts as the binder with the other solids. The final product has excellent colloidal properties.

To introduce sodium carboxymethylcellulose *alone* into the liquid egg material prior to or after pasteurization does not seem possible. If an attempt to do so is ventured, excessive foaming is created and small undissolved particles are noted throughout the liquid egg material. When sodium carboxymethylcellulose is used as an ingredient in conjunction with non-fat milk solids, sweet whey, and soya protein, premixed to an intimate state with these other ingredients, which acts as a carrier and as wetting agents, and when the liquid mixture is passed through a shear pump, there is no evidence of carboxymethylcellulose particles in the buildup of solids in the liquid egg. The application of heat as in pasteurization causes the suspended sodium carboxymethylcellulose to become more fluid and helps to prevent cook-on during the exposure to heat. The preferred amount is ideal in relation to the 1 to 5 reliquefying ability of the egg product of this invention. Any change in the reliquefying ratio of egg product could necessitate a change in the carboxymethylcellulose content, much less being used when less water is used.

According to one aspect of the invention, the carboxymethylcellulose is readily incorporated into the product by first thoroughly mixing with the other solids and then adding the mixed solids to the liquid egg mixture, all as hereinafter more fully set forth.

As a preservative, I may add about 0.05 to 0.1% of potassium sorbate, a water-soluble form of sorbic acid, to retard spoilage aond inhibit yeast and mold. This material not only acts to protect the finished product against contamination due to improper handling by the customer during use, but also is an excellent wetting agent which aid in introducing the milk and soya solids into the liquid egg mixture. The $C_5H_8COOH$ may also act as a pH regulator or buffer and it is more effective at the pH used than would be sodium benzoate, for example. Often in bakeries it is noted that the container for the liquefied egg product is left open, thus exposing the egg product to air-borne bacterial contamination, yeast and molds. Many times, a reliquefied egg product is held at room temparutre, then placed in a refrigerator for further use. Potassium sorbate helps to safeguard the product against customer abuse and the resulting consequences.

To provide a pleasing color and replace that lost by the elimination of most of the egg yolks, I may supply a certified color. Seasoning such as salt may also be added, but preferably is not generally used.

The solids are introduced into the liquid egg material to enable co-pasteurization followed by co-drying. The effects of co-pasteurization and co-drying are quite dramatic. The egg product produced in this manner is far superior in every respect to one made from the same ingredients by determining the solids present in liquid whites and in the liquid whole egg, allowing and compensating for the moisture content in each then, then taking the dried solids of the whites and solids of the whole egg, blending them with other solids, and arriving at a simple mechanical mixture.

The drawing is a flow diagram outlining the preferred treatment including mixing, heating, pasteurizing, homogenizing, and dehydration steps.

The flow diagram gives an example of the process of this invention. The non-fat milk solids, sweet whey, soya protein, sodium carboxymethylcellulose or other colloid and any other dry ingredients are mixed together in proper proportions in solids mixing zone 1. The mixed solids pass by a line 2 to a liquids-solids mixing zone 3, where they are added to the liquid whole egg and liquid egg white, which may have been mixed together and are preferably preheated to 135° to 140° F. To aid in mixing and preheating, a recirculation line 4 is provided. The preheating helps to prevent coagulation by keeping all the ingredients in a fluid state. Blending them at this stage enables them to cooperate together to protect the egg materials when the temperature is raised.

The mixed and preheated mixture is preferably conducted by line 5 to a homogenization zone 6, where homogenization may be achieved at 1500 p.s.i. While there is nothing new in the homogenization of liquid egg, there is this of interest in the homogenization of this low-fat egg product: the flavor of an egg is largely contained within the yolk, and in this product, the fine flavor is apparently associated with the distribution of the remaining fat throughout the egg product. Homogenization multiplies the fat globules approximately 10 times by dividing them into smaller globules. This improves the flavor characteristics of the liquid egg product much in the same manner that homogenization does with the fat content of milk.

From the zone 6, the homogenized mixture is conducted to a heating zone 7, where the temperature is raised to between 148.5° and 155° F. Then the material may be taken to a high heat zone 8, where it is pasteurized by flashing under vacuum at 161°–165° F. This may be done by steam infusion or injection. Or the zone 8 may be omitted and the mixture pasteurized wholly in zone 7 by being held there for from 2½ minutes at 148.5° F. to 1 minute at 155° F. The material may be treated in zone 7 in a holding tube.

From the heating zone 8 (zone 7 if the zone 8 is omitted), the material passes to a vacuum tank cooling zone 9. This zone 9 may be a vacuum tank where there is sufficient vacuum to cool it to 150° F. or even down to 140° F.

From the vacuum tank 9 or from the flashing zone 8, if used, the product flows to and through a cooling zone 10, where the liquid egg product is brought down to a temperature of about 38°–40° F. and then sent either to refrigerated storage 11 or to a drier at a dehydration zone 12.

When the product has completed the pasteurization cycle and has been homogenized, it may be held in storage at 34° to 38° F. for storage and/or drying purpose. At this temperature the liquid egg product may be packaged for use, frozen in cartons or in cans for all the intents and purposes that whole eggs are used for. Or it may be dried by spray-drying.

EXAMPLE 1

9,000 pounds of liquid egg white and 3,000 pounds of liquid whole egg are charged into a 2,000 gallon open-top tank equipped with a recirculating overshot system operated by a shear pump capable of intimate mixing of its throughput. Meanwhile, in a horizontal type ribbon mixer 320 pounds of non-fat dry milk solids, 455 pounds of dry sweet whey and 50 pounds of isolated soya protein are thoroughly and intimately mixed with 91 pounds sodium carboxymethylcellulose, 7 pounds of potassium sorbate and 5 ounces of certified edible color. The completely mixed solids are then added to the liquid egg mixture by introduction into the suction of the shear pump while circulating the egg mixture from the bottom to the top of the tank, but under the liquid surface. After introduction of all the solids, circulation is continued until the solids are completely dispersed into and throughout the liquid egg. After the admixture is complete, the temperature of the tank contents is raised to 135°–140° F. by circulation through a heating tube. The product is then charged through a conventional homogenizer operating at 1,500 p.s.i. The temperature of the homogenized mixture is then raised, and the liquid egg mixture therefrom at a temperature of about 155° F. is charged through a steam injection conduit where the temperature is raised to 161° to 165° F. for 2 to 5 seconds (flashing) after which the thus-heated material is charged into a vacuum tower, where the temperature is immediately dropped to about 150° F. and thence through a cooler, where the temperature is reduced to 38° to 40° F. The cooled liquid is then dehydrated, in a conventional vacuum dehydrator, to a dry powder. Due to the specific order of processing conditions and proportions used, no foaming, no coagulation of solids, and no cook-on is encountered during the operation. The product is tested for complete pasteurization and found to be 100% Salmonella negative. Additionally the product is functionally like egg. The powder may be reconstituted by adding five parts by weight of water to one part by weight of the powder.

EXAMPLE 2

Similar proportions of the same ingredient as in Example 1 are processed as in Example 1 except that the effluent from the heating tube, instead of being steam-injected to raise the temperature to 161°–165° for 2 to 5 seconds, is maintained at a temperature of from 148.5° F. to 155° F. for 150 seconds by passage through an approprimate length of tubing, thereby obtaining adequate pasteurization. The dehydrated product is similar to that of Example 1.

EXAMPLE 3.—Scrambled eggs

One pound of the product from Example 1 is mixed with five pints of water. The mixture is whipped into a batter, permitted to stand five minutes, and again whipped until all particles are dispersed. The mixture has the same consistency and functionability as a batter similarly prepared from one pound of dried whole egg and two-and-one-half to three pints water. The mixture may be cooked into an omelet or scrambled eggs on a greased griddle, stirring as necessary. In place of water, whole milk may be used. The cooked omelet (or scrambled eggs) is found to be tasty and to have a satisfactory consistency and texture.

EXAMPLE 4.—Cake

A portion of the product from Example 1 is used in an ordinary type of cake as a substitute for eggs, at the rate of one-half oz. of the powder for each whole fresh egg substituted. In this instance, the product is preferably reconstituted at the rate of one part of the dried egg product to four parts of water. Used in cakes where the sugar and flour levels are equal, excellent results are obtained.

EXAMPLE 5.—Custard

In place of two large fresh eggs weighing about 114 grams having 30 grams of solids content, 20.5 grams of the egg product from Example 1 and 2 are used. At the same time, the ordinary requirement of 3 cups of milk may be reduced to 2½ cups of milk. With this is blended ⅓ cup of sugar and ¼ teaspoon of salt. Vanilla or nutmeg or both are added to flavor. In place of 2½ cups of milk, 2 cups of milk and ½ cup of water may be used. The product gives an excellent custard, especially as a filler for custard pies; and saves considerably in egg solid content—9.5 grams thereof.

Many other foods using eggs are similarly made with very satisfactory results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A pasturized low-calorie egg product which resembles whole fresh egg in taste and nutritional value, including in combination, by weight, approximately:
   150 parts of liquid egg white,
   30 to 100 parts of liquid whole egg,
   8 to 16 parts of solids chosen from the group consisting of non-fat milk solids and sweet whey solids and a mixture of non-fat milk solids and sweet whey solids with each other,
   ½ part to 4 parts of isolated vegetable protein solids,
   0.1 to 2 parts of sodium carboxymethylcellulose, intimately mixed and adjusted to a pH of at least 9.
2. The egg product of claim 1 dehydrated to a powder, capable of exhibiting the functional foaming and stiffness of whole fresh egg when mixed with up to five parts of water to each part of the powder.
3. The egg product of claim 2 having water added in an amount of up to about 100 parts by weight per 20 parts by weight of said powder.
4. The egg product of claim 1 wherein said protein solids contain between 0.1 and 15 parts by soya lecithin.
5. The egg product of claim 1 wherein said 8 to 16 parts consists of equal portions of non-fat milk solids and sweet whey solids.
6. The egg product of claim 1 having potassium sorbate in an amount effective to preserve the product from mold and yeast activity.
7. A method of producing a 100% Salmonella negative low-fat egg product having the low calorie formula of claim 1 and having the functional qualities of whole fresh egg when added to water in proportions up to five parts of water per 1 part of product, comprising:
   mixing the non-fat milk, sweet whey, vegetable protein, and sodium carboxymethylcellulose together in the proportions stated in claim 1 and then mixing them with the three-to-one warm blend of liquid egg white and liquid whole eggs, in the amounts stated in claim 1,
   raising the temperature of the resulting mixture to a temperature and for a time sufficient to insure 100% Salmonella negative, to pasteurize the product,
   cooling the pasteurized mixture, and
   dehydrating it to a dry solid.
8. The mtehod of claim 7 wherein the non-fat milk, sweet whey, vegetable protein, and sodium carboxymethylcellulose are all added in dry powdered form to the egg blend.
9. The method of claim 7 wherein at least one of the non-fat milk, sweet whey, and vegetable protein is added to the blend in the form of a water dispersion.
10. A pasteurized low-calorie egg product resembling, whole fresh egg in taste and nutritional value, including in combination, by weight, approximately:
   150 parts of liquid egg white,
   30 to 100 parts of liquid whole egg,
   8 to 16 parts of solids chosen from the group consisting of non-fat milk solids, sweet whey solids, and a mixture of the non-fat milk and sweet whey solids with each other,
   ½ part to 4 parts of isolated vegetable protein solids,
   0.1 to 2 parts of hydrophilic thixotropic material chosen from the group consisting of sodium carboxymethylcellulose, pregelled starch, methyl cellulose, guar gum, gum arabic, gum tragacanth, agar-agar, carrageen, and alginic acid and salts thereof,
   intimately mixed and adjusted to a pH of at least 9.
11. The egg product of claim 10 dehydrated to a powder, capable of exhibiting the functional foaming and stiffness of whole fresh egg when mixed with up to five parts of water to each part of the powder.
12. The egg product of claim 11 having water added in an amount of up to about 100 parts by weight per 20 parts by weight of said powder.
13. The egg product of claim 10 having potassium sorbate in an amount effective to reserve the product from mold and yeast activity.
14. A method of producing a 100% Salmonella negative low-fat egg product having the low calorie formula of claim 10 and having the functional qualities of whole fresh egg when added to water in proportions up to five parts of water per 1 part of product, comprising:
   mixing said non-fat milk, sweet whey, vegetable protein, and said thixotropic hydrophilic material together in the proportions stated in claim 11 and then mixing them with the three-to-one warm blend of liquid egg white and liquid whole eggs, in the amounts stated in claim 10,
   raising the temperature of the resulting mixture to a temperature and for a time sufficient to insure 100% Salmonella negative, to pasteurize the product,
   cooling the pasteurized mixture, and
   dehydrating it to a dry solid.
15. The method of claim 14 wherein the non-fat milk, sweet whey, vegetable protein, and thixotropic hydrophilic material are all added in dry powdered form to the egg blend.
16. The method of claim 14 wherein at least one of the non-fat milk, sweet whey, and vegetable protein is added to the blend in the form of a water dispersion.
17. A pasteurized low-calorie egg product resembling whole fresh egg in taste and nutritional value, including in combination, by weight, an intimate mixture at a pH of approximately 9 of approximately:
   300 parts of liquid egg white,
   100 parts of liquid whole egg,
   11 parts of non-fat milk solids,
   15 parts of sweet whey solids,
   2 parts of isolated vegetable protein solids,
   3 parts of sodium carboxymethylcellulose.
18. The product of claim 17 having about ¼ part by weight of potassium sorbate.
19. The egg product of claim 17 dehydrated to a powder, said powder being capable of exhibiting the functional foaming and stiffness of whole fresh egg when mixed with up to five parts of water to each part of the powder.
20. A homogenized, pasteurized, dehydrated low calorie egg product resembling, when reconstituted with water, whole fresh egg in taste and nutritional value, including in combination, by weight, approximately:
   9000 parts of liquid egg white,
   3000 parts of liquid whole egg,
   320 parts of non-fat milk solids,
   455 parts of sweet whey solids,
   50 parts of isolated vegetable protein solids,
   90 parts of sodium carboxylmethylcellulose,
   7 parts of potassium sorbate,
   said product after mixing all the parts together having a pH slightly over 9, and
   when dehydrated to a powder, said powder being capable of exhibiting the functional foaming and stiffness of whole fresh egg when mixed with five parts of water to each part of the powder.
21. A method of producing a 100 Salmonella negative low-fat egg product having the functional qualities of whole fresh egg when added to water in proportions up to five parts of water per 1 part of product, comprising:
   mixing with a three-to-one warm mixture of liquid egg white and liquid whole eggs, a mixture of non-fat milk solids, sweet whey, vegetable protein, in quanti- ties sufficient to compensate for the difference in protein value between the said mixtures and liquid whole egg, and thixotropic hydrophilic colloid in amount sufficient to impart said functional qualities, the resulting mixture being adjusted to a pH of about 9, homogenizing the mixture, raising the temperature of the homogenized mixture to a temperature and for a time sufficient to insure 100% Salmonella negative, to pasteurize the product, cooling the pasteurized mixture, and dehydrating it to a dry solid.

References Cited

UNITED STATES PATENTS

| | | | |
|---|---|---|---|
| 2,841,499 | 7/1958 | Grossi | 99—148 |
| 3,093,487 | 6/1963 | Jones et al. | 99—161 |
| 3,207,609 | 9/1965 | Gorman et al. | 99—114 |

A. LOUIS MONACELL, Primary Examiner

W. BOVEE, Assistant Examiner

U.S. Cl. X.R.

99—114